(Model.)
2 Sheets—Sheet 1.
O. R. VAN VECHTEN.
OVER STITCH SEWING MACHINE.
No. 302,063. Patented July 15, 1884.
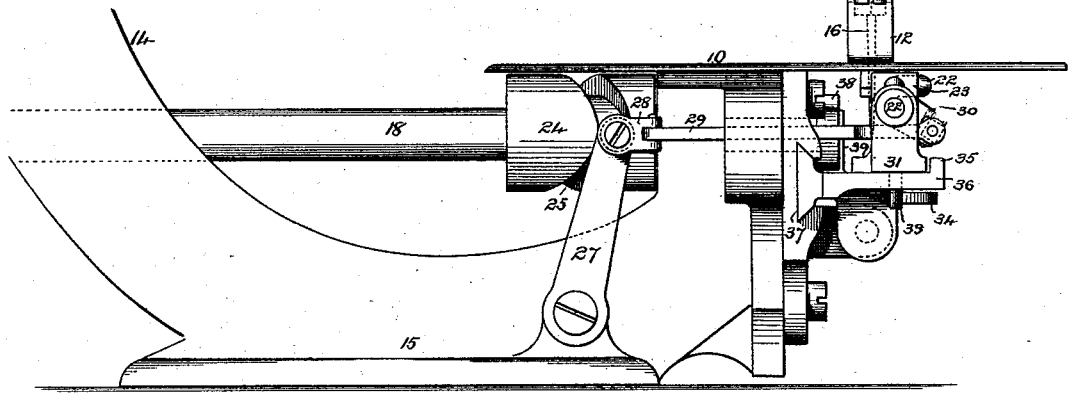
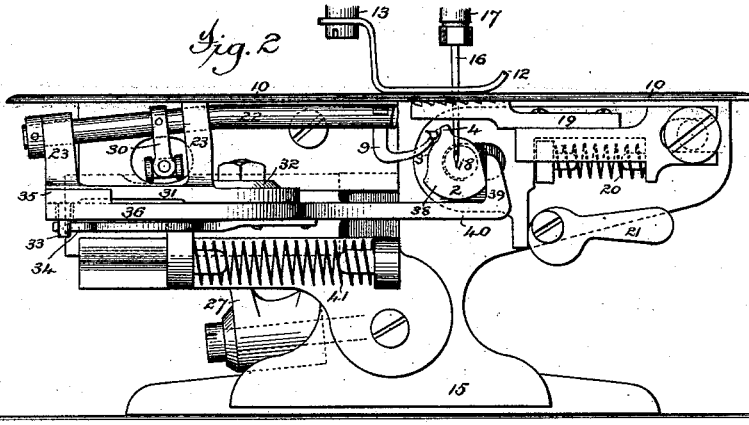
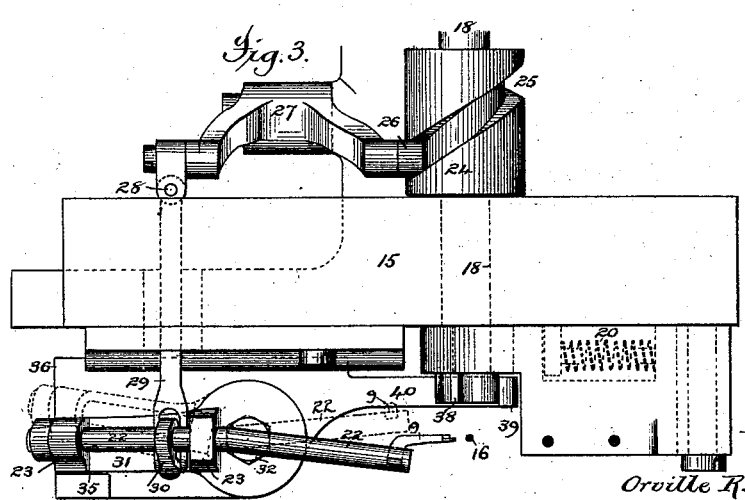
Attest:
Geo. H. Grahaw
A. N. Jasbern
Inventor,
Orville R. Van Vechten,
by Munson & Philipp
Attys.

(Model.)
2 Sheets—Sheet 2.
O. R. VAN VECHTEN.
OVER STITCH SEWING MACHINE.
No. 302,063.     Patented July 15, 1884.
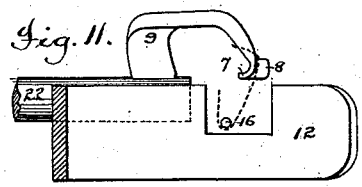
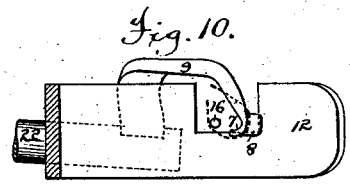
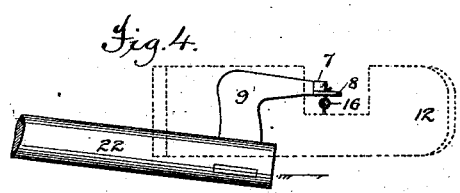
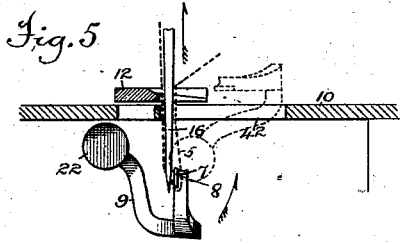
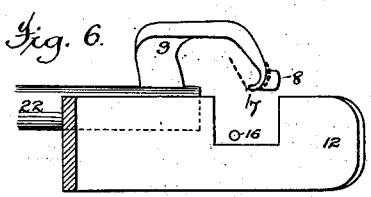
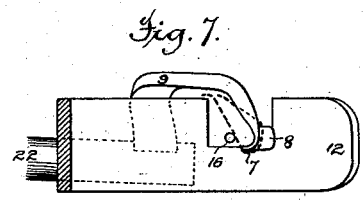
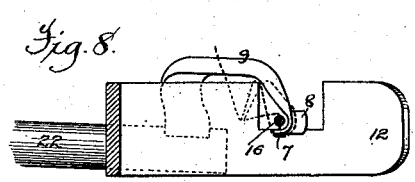
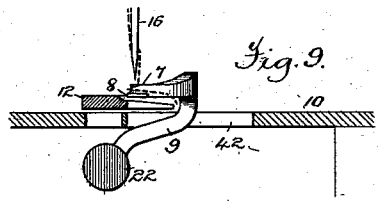
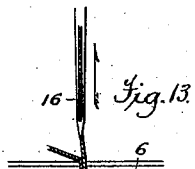
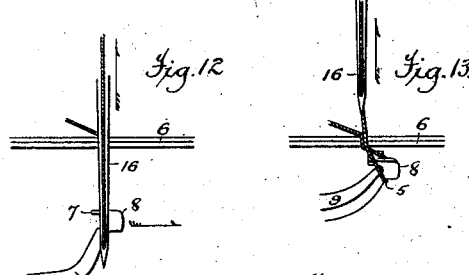
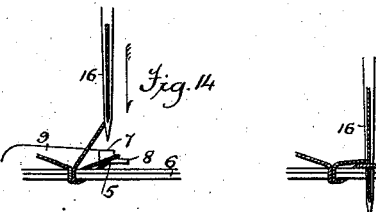
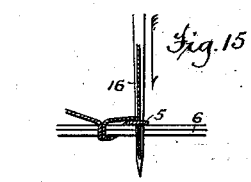
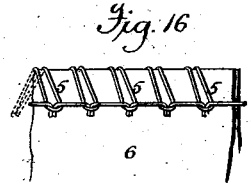
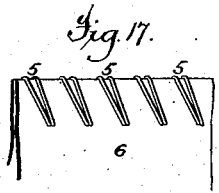
Attest:
Geo. H. Graham
A. N. Jasbera
Inventor,
Orville R. Van Vechten,
by Munson & Philipp
Attys.

UNITED STATES PATENT OFFICE.

ORVILLE R. VAN VECHTEN, OF NEW YORK, N. Y.

OVERSTITCH SEWING-MACHINE.

SPECIFICATION forming part of Letters Patent No. 302,063, dated July 15, 1884.

Application filed September 3, 1883. (Model.)

*To all whom it may concern:*

Be it known that I, ORVILLE R. VAN VECHTEN, a citizen of the United States, residing in the city of New York, county of New York, and State of New York, have invented certain new and useful Improvements in Overstitch Sewing-Machines, fully described and represented in the following specification and the accompanying drawings, forming a part of the same.

The present invention relates to a sewing-machine which is designed and adapted to unite the edges of the fabric by what is known as an "overstitch" or "overseam"—that is to say, a seam in which the thread, in addition to being carried through the plies of the fabric, is carried around the edges of the same. Such a seam permits the plies of the united material to be spread flat or separated, so that their edges will simply abut or lie adjacent to each other, and is particularly desirable for many kinds of work—as, for example, in making up many classes of knit goods, or uniting the breadths of carpets, or, in fact, in any case where it is desirable to prevent the raw edges of the fabric from raveling, or that the united fabric, when spread flat, should present a perfectly smooth surface and be throughout of uniform thickness.

The details of construction and organization of the mechanism in which the invention is embodied are hereinafter so fully explained as to render further preliminary description unnecessary to a proper understanding of the invention.

In the accompanying drawings, Figure 1 is a rear elevation of a mechanism embodying the invention. Fig. 2 is a side elevation of the same. Fig. 3 is a plan view of the same, the presser-foot, feed-bar, and cloth-plate being removed. Figs. 4, 5, 6, 7, 8, 9, 10, and 11 are detail views showing the looper in its different positions. Figs. 12, 13, 14, and 15 are views showing the different steps in the formation of the stitch, and Figs. 16 and 17 show the seam from opposite sides of the fabric.

Referring to said drawings, it is to be understood that the cloth-plate 10, upon which the fabric rests during the sewing operation, is arranged and supported in substantially the same manner as in ordinary sewing-machines. The presser-foot 12, between which and the plate 10 the cloth passes, is also arranged in the usual manner, it being attached to a rod, 13, which is yieldingly supported in an overhanging arm or bracket, 14, which rises from the base 15 of the machine. The needle 16 is also of the usual construction, and is attached to the end of a reciprocating needle-bar, 17, which receives motion from a lever which is pivoted to the arm 14, and operated through suitable connections from the main shaft 18, all in the usual manner. The arm 14 is also provided with the usual devices for supporting, guiding, and giving the proper tension to the thread. The cloth-feeding mechanism is also of a common construction, consisting of a toothed bar, 19, which is operated by a spring, 20, and a cam upon the main shaft 18, and provided with the usual cam-lever, 21, for regulating the length of the stitch.

The mechanism thus far described is shown merely for the purpose of illustration, as any of the other common forms of needle-driving, tension, and feed mechanisms may be employed, if preferred. This mechanism, instead of being provided with the ordinary looping-hook, by which the loop of the thread, after being carried through the fabric by the needle, is caught and retained in position for the needle to pass through it upon its next descent, is provided with devices by which the loop of the thread is taken, carried around the edge of the fabric, and presented to the needle upon the entering side, so that the needle, upon its second descent, passes through the loop before it enters the fabric, instead of after it has passed through the same, thus forming an overstitch instead of an ordinary chain-stitch. This transfer of the loop is accomplished by means of a looper or picker arranged beneath the cloth-plate 10 and operated from the main shaft 18. This looper consists of a curved metal bar, 9, of substantially the form shown in the various figures of the drawings, provided at its end with a lip, 8, which enters between the needle and the thread, so as to catch the loop and carry it around the edge of the fabric, and a curved flange, 7, which serves to hold the loop distended while the needle passes through it.

To effect the transfer of the loop as specified in the best manner, the looper is given the following movements: First, it is caused to advance—that is to say, move toward the operator, or in a direction opposite to that of the feed of the cloth—until its lip 8 has entered the loop formed by the downward passage of the needle; second, it is oscillated about its axis to carry the loop around the edge of the fabric; third, it is vibrated laterally, so as to carry the loop onto the fabric and into line with the needle; fourth, it is caused to retreat—that is to say, move in a direction opposite to its advance—slightly, so as to carry the loop under the needle and into position for the needle to pass through it upon its descent; fifth, after the needle has passed through the loop, the looper is caused to again advance slightly, so as to carry its flange 7 to the front of the needle; sixth, it is caused to vibrate laterally, so as to clear itself from the needle; and, seventh, it is caused to simultaneously oscillate and retreat back to its normal position.

To permit of the oscillating movements just specified, the looper is secured to the end of a rock-shaft, 22, which is mounted in suitable bearings, 23, located beneath the cloth-plate, as shown in Figs. 2 and 3. These oscillating movements are effected by means of a properly-shaped cam, 24, secured to the shaft 18, in the groove 25 of which rests a bowl, 26, extending from one arm of a pivoted yoke, 27, the other arm of which is connected by a universal joint, 28, with a link, 29, which is pivoted to a rock-arm, 30, extending from the shaft 22, all as shown in Figs. 1, 2, and 3.

To permit of the vibratory movement specified, the bearings 23 of the shaft 22 are secured to a bed-piece, 31, which is pivoted at one end to a bolt, 32, so as to be capable of a slight lateral vibratory movement, as indicated by dotted lines in Fig. 3. The bed-piece 31 is provided with a stud, 33, which is acted upon by a spring, 34, so as to normally hold said bed-piece and the shaft 22 in the position shown by full lines in Fig. 3, the outward movement of the bed-piece being limited by a stop, 35. The vibratory movement of the looper is also effected by the cam 24, the groove of which is of such shape that the yoke 27 will move a short distance after the link 29 and rock-arm 30 have been drawn into line, from which it results that after the shaft 22 has ceased to rock and the looper has reached the limit of its upward movement the bed-piece 31 will be drawn to the position shown in dotted lines in Fig. 3, thereby, as will readily be seen, vibrating the looper laterally, and carrying it over the edge of the fabric into line with the needle.

To permit the advancing and retreating movements specified, the bed-piece 31 is mounted upon a carriage, 36, which slides in a dovetail groove, 37, in the bed 15 of the machine. These movements are effected by means of a cam, 38, secured to the end of the shaft 18, which acts upon a stud, 39, secured to an extension, 40, of the carriage, and a spring, 41, which acts to hold the stud 39 constantly pressed against said cam. If preferred, the spring 41 may be omitted and a second cam provided for operating the carriage, so that the same will be moved positively in both directions.

It will be observed that the shaft 22 is slightly bent, so that as it is rocked, as just described, its free end, which carries the looper, is caused to vibrate laterally, as indicated by dotted lines in Fig. 3, from which it results that the looper, instead of moving in the arc of a circle, as would be the case if the shaft 22 were straight, has an oval path of travel, as indicated by the dotted lines in Fig. 5. This is a feature of great importance, as by this means the looper is enabled to carry the loop around the edge of the fabric with the least possible amount of travel.

It will be observed that the cloth-plate 10 is provided with a suitable opening, 42, (see Figs. 5 and 9,) for the passage of the looper, and that the presser-foot 12 is provided with a lateral recess for the same purpose.

The operation of the mechanism just described is as follows: The plies of fabric 6, which are to be united, having been placed in proper position beneath the presser-foot and the shaft 18 set in motion, the needle will pass downward through the fabric, carrying with it the loop 5 of the thread. As the needle reaches the limit of its downward movement and commences to return, so as to allow the loop to slacken a trifle and stand away from the needle, the part 2 of the cam 38 will come into contact with the stud 39 and advance the looper from the position shown in Figs. 2 and 3 to the position shown in Figs. 4, 5, and 12, and cause the lip 8 to enter the loop 5, as shown in said figures. As soon as this takes place the cam 24 will rock the shaft 22, so as to oscillate the looper from the position shown in Figs. 4, 5, and 12 to the position shown in Fig. 6 and by dotted lines in Fig. 5, thereby carrying the loop 5 outward and upward past the edge of the fabric.

Fig. 13 shows the looper in a position intermediate of those shown in Figs. 5 and 12 and 6. When the looper has arrived in this position, the continued action of the cam 24 will move the bed-piece 31 to the position shown in dotted lines in Fig. 3, thereby vibrating the looper laterally from the position shown in Fig. 6 over the edge of the fabric to the position shown in Fig. 7. By the time this has taken place the part 3 of the cam 38 will come into contact with the stud 39, thereby allowing the looper to retreat slightly—say about a sixty-fourth to a thirty-second of an inch—so as to bring the loop into proper position to be caught by the needle upon its next descent, as shown in Figs. 8, 9, and 14. As soon as the needle has been withdrawn from the fabric upon its upward movement the fabric will be advanced for the next stitch, which will draw the thread to such a position that the flange 7 of the looper will hold the loop properly distended, as shown in Fig. 8. As soon as the loop has been carried to the position just described the needle will again commence to descend, and in so doing will pass through the loop 5, as shown in Fig. 15. As soon as the loop 5 has been caught by the needle the part 4 of the cam 38 will come into engagement with the stud 39 and cause the looper to again advance to the position shown in Fig. 10, so as to carry the flange 7 to the front of the needle. As soon as this takes place the cam 24 will arrive in such position as to allow the spring 34 to move the plate 31 back to its normal position, which will vibrate the looper to the position shown in Fig. 11, and immediately after this the looper will simultaneously oscillate and retreat back to its normal position, from which it will be again advanced after the needle has reached the limit of its downward movement, and so the operation will continue to be repeated at each reciprocation of the needle, the loop being each time carried around the edge of the fabric and caught upon the upper side, so as to unite the fabric by an overstitch seam, such as shown in Figs. 16 and 17. It is of course to be understood that any suitable form of gage or guide may, if desired, be attached to the cloth-plate to aid in regulating or securing uniformity in the width of the seam, and also that any suitable trimming apparatus may be employed in connection with the sewing mechanism, so that, if necessary, the raw edges of the fabric can be automatically trimmed before being united.

In some cases the looper, instead of being advanced from the position shown in Fig. 6 to that shown in Fig. 7, and then caused to retreat to the position shown in Fig. 8, may be vibrated directly from the position shown in Fig. 6 to that shown in Fig. 8; but it will usually be preferable to cause it to move in the manner first described.

Although, as here shown, the needle reciprocates vertically and the fabric is fed beneath the needle, yet it will readily be seen that by a proper arrangement of the parts the invention could be applied equally well to a machine in which the needle moves horizontally, or to one in which the needle travels over the fabric.

In conclusion, it is to be remarked that the mechanism herein shown and described as embodying the invention may be varied greatly in many of its details without departing from or losing the advantages of the invention, the essential feature of which is the looper having the movements described, and not the particular devices herein shown for effecting these movements. I do not therefore limit myself to the particular devices herein shown for effecting the described movements of the looper, but refer to them simply as examples of mechanisms suitable for the purpose.

What I claim is—

1. The combination, with the thread-carrying needle and means for operating the same, of the looper 9, mounted upon the rock-shaft 22, located beneath the cloth-plate, means, as the cam 24 and connections, for rocking or partially rotating said shaft to cause the looper to carry the loop around the edge of the fabric, and means, as the cam 24, support 31, and connections, for vibrating said shaft laterally to cause the looper to carry the loop onto the fabric, substantially as described.

2. The combination, with the thread-carrying needle and means for operating the same, of the looper 9, mounted upon the rock-shaft 22, located beneath the cloth-plate, means, as the cam 38 and connections, for moving said shaft longitudinally to enter the looper between the needle and thread, means, as the cam 24 and connections, for rocking or partially rotating said shaft to cause the looper to carry the loop around the edge of the fabric, and means, as the cam 24, support 31, and connections, for vibrating said shaft laterally to cause the looper to carry the loop onto the fabric, substantially as described.

3. The combination, with the thread-carrying needle and means for operating the same, of the looper 9, mounted upon the bent rock-shaft 22, located beneath the cloth-plate, means for causing said looper to enter between the thread and needle, and means for rocking said shaft to cause the looper to carry the loop around the edge of the fabric, substantially as described.

4. The combination, with the thread-carrying needle and means for operating the same, of the looper 9, mounted upon the bent rock-shaft 22, located beneath the cloth-plate, means for causing said looper to enter between the thread and needle, means for rocking said shaft to cause the looper to carry the loop around the edge of the fabric, and means for vibrating said shaft to cause the looper to carry the loop onto the fabric, substantially as described.

5. The combination, with the thread-carrying needle and means for operating the same, of the looper 9, arranged beneath the cloth-plate, and means, as the bent rock-shaft 22 and its connections, for causing said looper to take an oval path of travel in carrying the loop around the edge of the fabric, substantially as described.

6. The combination, with the thread-carrying needle and means for operating the same, of the looper 9, means, as the bent rock-shaft 22 and its connections, for causing said looper to take an oval path of travel in carrying the loop around the edge of the fabric, and means, as the cam 24, support 31, and connections, for causing said looper to take a straight path of travel in carrying the loop onto the fabric, substantially as described.

7. The combination, with the thread-carrying needle and means for operating the same, of the bent rock-shaft 22, mounted on a reciprocating carriage beneath the cloth-plate and carrying the looper, and means for reciprocating said carriage so as to cause the looper to enter between the thread and needle, substantially as described.

8. The combination, with the thread-carrying needle and means for operating the same, of the bent rock-shaft 22, carrying the looper, and mounted upon a pivoted support beneath the cloth-plate, and means for vibrating said support so as to cause the looper to carry the loop onto the fabric, substantially as described.

9. The combination, with the thread-carrying needle and means for operating the same, of the bent rock-shaft 22, carrying the looper, and mounted upon a pivoted support beneath the cloth-plate, means for rocking said shaft to cause the looper to carry the loop around the edge of the fabric, and means for vibrating said support to cause the looper to carry the loop onto the fabric, substantially as described.

10. The combination, with the thread-carrying needle and means for operating the same, of the bent rock-shaft 22, carrying the looper, and mounted upon a pivoted support upon a reciprocating carriage beneath the cloth-plate, means for reciprocating said carriage to cause the looper to enter between the thread and needle, means for rocking said shaft to cause the looper to carry the loop around the edge of the fabric, and means for vibrating said support to cause the looper to carry the loop onto the fabric, substantially as described.

In testimony whereof I have hereunto set my hand in the presence of two subscribing witnesses.

ORVILLE R. VAN VECHTEN.

Witnesses:
   J. A. HOVEY,
   T. H. PALMER.